(12) United States Patent
Liang et al.

(10) Patent No.: US 7,158,282 B2
(45) Date of Patent: *Jan. 2, 2007

(54) ELECTROPHORETIC DISPLAY AND NOVEL PROCESS FOR ITS MANUFACTURE

(75) Inventors: Rong-Chang Liang, Cupertino, CA (US); Xiaojia Wang, Fremont, CA (US); Hongmei Zang, Sunnyvale, CA (US)

(73) Assignee: SiPix Imaging, Inc., Fremont, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/351,460

(22) Filed: Jan. 24, 2003

(65) Prior Publication Data

US 2003/0179436 A1    Sep. 25, 2003

Related U.S. Application Data

(63) Continuation-in-part of application No. 09/518,488, filed on Mar. 3, 2000, now Pat. No. 6,930,818.

(51) Int. Cl.
*G02B 26/00* (2006.01)

(52) U.S. Cl. .................................................. 359/296

(58) Field of Classification Search ................ 359/296; 345/107; 430/32, 34, 38; 524/474; 204/450
See application file for complete search history.

(56) References Cited

U.S. PATENT DOCUMENTS

| | | | |
|---|---|---|---|
| 3,229,607 A | 1/1966 | Battaglia | |
| 3,612,758 A | 10/1971 | Evans | |
| 3,668,106 A | 6/1972 | Ota | |
| 3,689,346 A | 9/1972 | Rowland | |
| 3,885,964 A | 5/1975 | Nacci | |
| 3,908,052 A | 9/1975 | Sanders | |
| 3,928,671 A | 12/1975 | Robusto | |
| 4,071,430 A | 1/1978 | Liebert | |
| 4,093,534 A | 6/1978 | Carter et al. | |
| 4,285,801 A | 8/1981 | Chiang | |
| 4,680,103 A | 7/1987 | Beilin Solomon I. et al. | |
| 4,721,739 A * | 1/1988 | Brenneman et al. | 523/161 |
| 4,741,604 A | 5/1988 | Kornfeld | |
| 4,741,988 A | 5/1988 | Van der Zande et al. | |
| 4,881,996 A * | 11/1989 | Nussbaum et al. | 156/157 |
| 4,891,245 A | 1/1990 | Micale | |
| 5,200,120 A | 4/1993 | Sakai | |
| 5,223,106 A * | 6/1993 | Gerace et al. | 204/488 |
| 5,274,481 A | 12/1993 | Kim | |
| 5,276,438 A | 1/1994 | DiSanto et al. | |
| 5,279,511 A | 1/1994 | DiSanto et al. | |

(Continued)

FOREIGN PATENT DOCUMENTS

CA    2340683    2/2001

(Continued)

OTHER PUBLICATIONS

Comiskey et al., "An electrophoretic ink for all-printed reflective electronic displays," Letters to Nature, MIT, The Media Laboratory, 20 Ames Street, Cambridge, MA 02139-4307, USA, May, 1998.

(Continued)

*Primary Examiner*—Hung Xuan Dang
*Assistant Examiner*—Tuyen Tra
(74) *Attorney, Agent, or Firm*—Howrey LLP

(57) ABSTRACT

This application is directed to electrophoretic displays and semi-finished display panels comprising display cells prepared from the microcup and top-sealing technologies.

10 Claims, 12 Drawing Sheets

U.S. PATENT DOCUMENTS

| | | | |
|---|---|---|---|
| 5,380,362 A | | 1/1995 | Schubert |
| 5,403,518 A | | 4/1995 | Schubert |
| 5,492,963 A | * | 2/1996 | Ozawa et al. ............... 524/576 |
| 5,534,583 A | * | 7/1996 | Roberts et al. ............. 524/476 |
| 5,573,711 A | | 11/1996 | Hou et al. |
| 5,589,100 A | | 12/1996 | Grasso et al. |
| 5,699,097 A | | 12/1997 | Takayama et al. |
| 5,731,860 A | | 3/1998 | Harada et al. |
| 5,739,889 A | | 4/1998 | Yamada et al. |
| 5,835,174 A | | 11/1998 | Clikeman et al. |
| 5,843,333 A | | 12/1998 | Hakemi |
| 5,877,848 A | | 3/1999 | Gillette et al. |
| 5,895,541 A | | 4/1999 | Kobayashi et al. |
| 5,914,806 A | | 6/1999 | Gordon II et al. |
| 5,930,026 A | | 7/1999 | Jacobson et al. |
| 5,942,154 A | | 8/1999 | Kim et al. |
| 5,961,804 A | | 10/1999 | Jacobson et al. |
| 5,976,405 A | | 11/1999 | Clikeman et al. |
| 5,985,084 A | | 11/1999 | Summersgill et al. |
| 6,017,584 A | | 1/2000 | Albert et al. |
| 6,037,058 A | | 3/2000 | Clikeman et al. |
| 6,064,508 A | | 5/2000 | Forgette et al. |
| 6,067,185 A | | 5/2000 | Albert et al. |
| 6,113,810 A | | 9/2000 | Hou et al. |
| 6,113,836 A | | 9/2000 | Sakai et al. |
| 6,120,588 A | | 9/2000 | Jacobson |
| 6,120,839 A | | 9/2000 | Comiskey et al. |
| 6,120,946 A | | 9/2000 | Johnson et al. |
| 6,166,797 A | | 12/2000 | Bruzzone et al. |
| 6,172,798 B1 | | 1/2001 | Albert et al. |
| 6,184,856 B1 | | 2/2001 | Gordon, II et al. |
| 6,191,250 B1 | | 2/2001 | Aida et al. |
| 6,239,896 B1 | | 5/2001 | Ikeda |
| 6,274,284 B1 | * | 8/2001 | Aylward et al. ............... 430/97 |
| 6,294,257 B1 | * | 9/2001 | Tsukakoshi et al. ........ 428/400 |
| 6,312,304 B1 | | 11/2001 | Duthaler et al. |
| 6,327,072 B1 | | 12/2001 | Comiskey et al. |
| 6,337,358 B1 | * | 1/2002 | Whitehouse et al. ....... 523/200 |
| 6,337,761 B1 | | 1/2002 | Rogers et al. |
| 6,356,376 B1 | * | 3/2002 | Tonar et al. ................. 359/267 |
| 6,361,830 B1 | * | 3/2002 | Schenk et al. ........... 427/427.5 |
| 6,392,785 B1 | | 5/2002 | Albert et al. |
| 6,392,786 B1 | | 5/2002 | Albert |
| 6,400,430 B1 | | 6/2002 | Nakao et al. |
| 6,400,492 B1 | | 6/2002 | Morita et al. |
| 6,512,626 B1 | | 1/2003 | Schmidt |
| 6,514,328 B1 | | 2/2003 | Katoh et al. |
| 6,525,865 B1 | | 2/2003 | Katase |
| 6,636,341 B1 | | 10/2003 | Kanbe |
| 6,751,007 B1 | * | 6/2004 | Liang et al. ................. 359/296 |
| 6,788,449 B1 | * | 9/2004 | Liang et al. ................. 359/296 |
| 6,795,138 B1 | * | 9/2004 | Liang et al. ................... 349/92 |
| 6,795,229 B1 | * | 9/2004 | Liang et al. ................. 359/296 |
| 6,829,078 B1 | * | 12/2004 | Liang et al. ................. 359/296 |
| 6,831,770 B1 | * | 12/2004 | Liang et al. ................. 359/296 |
| 6,833,177 B1 | * | 12/2004 | Chen et al. .................. 428/166 |
| 6,833,943 B1 | * | 12/2004 | Liang et al. ................. 359/296 |
| 6,850,355 B1 | * | 2/2005 | Liang et al. ................. 359/296 |
| 6,859,302 B1 | * | 2/2005 | Liang et al. ................. 359/296 |
| 6,862,128 B1 | | 3/2005 | Katase |
| 6,885,495 B1 | | 4/2005 | Liang et al. |
| 6,982,178 B1 | | 1/2006 | LeCain et al. |
| 2002/0008898 A1 | | 1/2002 | Katase |
| 2002/0075556 A1 | | 6/2002 | Liang et al. ................. 359/296 |
| 2002/0126249 A1 | | 9/2002 | Liang et al. |
| 2002/0166771 A1 | | 11/2002 | Kanbe |
| 2002/0182544 A1 | | 12/2002 | Chan-Park et al. |
| 2005/0133154 A1 | | 6/2005 | Daniel et al. |

FOREIGN PATENT DOCUMENTS

| | | |
|---|---|---|
| DE | 199 27 359.6 | 12/2000 |
| EP | 0990942 | 4/2000 |
| EP | 1065553 | 1/2001 |
| EP | 1 089 118 A2 | 4/2001 |
| EP | 1195603 | 4/2002 |
| JP | 57104116 | 6/1982 |
| JP | 60-205452 | 10/1985 |
| JP | 64 86116 | 1/1990 |
| JP | 02223934 | 9/1990 |
| JP | 02284125 | 11/1990 |
| JP | 02284126 | 11/1990 |
| JP | 04-307523 | 10/1992 |
| JP | 59-171930 | 9/1994 |
| JP | 6242423 | 9/1994 |
| JP | 2000 035677 | 2/2000 |
| JP | 2000 075497 | 3/2000 |
| JP | 2001 042118 | 2/2001 |
| JP | 2001 056653 | 2/2001 |
| WO | WO 98/57226 | 12/1998 |
| WO | WO 99/08151 | 2/1999 |
| WO | WO 99/53373 | 10/1999 |
| WO | WO 99/56171 | 11/1999 |
| WO | WO 00/36649 | 6/2000 |
| WO | WO 00/60410 | 10/2000 |
| WO | WO 00/77571 | 12/2000 |
| WO | WO01/67170 | 9/2001 |
| WO | PCT/US04/05450 | 11/2004 |

OTHER PUBLICATIONS

Andre W.L. Dalisa, "Electrophoretic Display Technology," Phillips Laboratories, Briarcliff Manor, NY 10510, Revised Mar. 8, 1997.

Dalisa, A.L., "Electrophoretic Display Technology", IEEE Trans. Electron Devices-24:827-834 (1977).

Harbour, J.R., et al., "Subdivided Electrophoretic Display," Xerox Disclosure Journal, US, Xerox Corporation, Stamford, Conn.-4(6):705 Nov. 1979 (XP002123212) the whole document.

Harvey. T.G., "Replication techniques for micro-optics", SPIE Proc.-3099:76-82 (1997).

J.C. Lewis, "Electrophoretic Displays," Allen Clark Research Centre, The Plessey Company Limited, Caswell, Towcester, Northants, England.

Murau and Singer, "The understanding and elimination of some suspension instabilities in an electrophoretic display," Phillips Laboratories, Briarcliff Manor, NY 10510, Apr. 10, 1978.

Mürau, P., et al., "The understanding and elimination of some suspension instabilities in an electrophoretic display", J. Appl. Phys.-49(9):4820-4829 (1978).

Nakamura et al., "Development of Electrophoretic Display Using Microcapsulated Suspension," NOK Corporation, Kanagawa, Japan & NOK Corporation, Ibaraki, Japan.

Ota et al., "Electrophoretic Image Display (IPID) Panel," Wireless Research Laboratory, Matsushita Electric Industrial Company, Ltd1, Osaka, 571, Japan, Feb. 7, 1973.

Slafer, W.D., et al., "Continuous Manufacturing of Thin Cover Sheet Optical Media", SPIE Proc.-1663:324-334 (1992).

Hopper, M.A. et al., "An Electrophoretic Display, it's Properties, Model and Addressing", IEEE Transactions on Electron Devices, 26(8): 1148-1152.

Drzaic, P.S., "Liquid Crystal Dispersions", The PDLC Paradigm, pp. 1-9, (1995).

Singer, B. "X-Y Addressable Electrophoretic Display", Proc. SID-18 (3/4): 255-266 (1977).

Kazlas, P. et al., "SVGA Microencapsulated Electorphoretic Active Matrix Display for Information Applicances" *SID 01 Digest* 152-155 (2001).

Bryning et al., "Reverse-Emulsion Electrophoretic Display (REED)" *SID 98 Digest* 1018-1021 (1998).

Swanson et al., "High Performance Electrophoretic Displays" *SID 00 Digest* 29-31 (2000).

Inoue, S. et al., "High Resolution Microencapsulated Electrophoretic Display (EPD) Driven by Poly-Si TFTs With Four-Level Grayscale" *IEEE Transactions on Electron Devices* 49(8):1532-1539 (2002).

Matsuda Y. "Newly designed, high resolution, active matrix addressing in plane EPD" *IDW 02 EP2-3* 1341-1344 (2002).

Ota et al., "Developments in Electrophoretic Displays" *Proc. of SID* 18:243-254 (1977).

Kishi, E et al, "5.1 Development of In-Plane EPD", Canon Research Center, SID Digest, 2000, pp. 24-27.

Liang, R.C et al., "Microcup Electrophoretic Displays by Roll-to-Roll Manufacturing Processes" *Proc. of the IDW'02*, International Conference Center Hiroshima (Dec. 4-6, 2002).

* cited by examiner

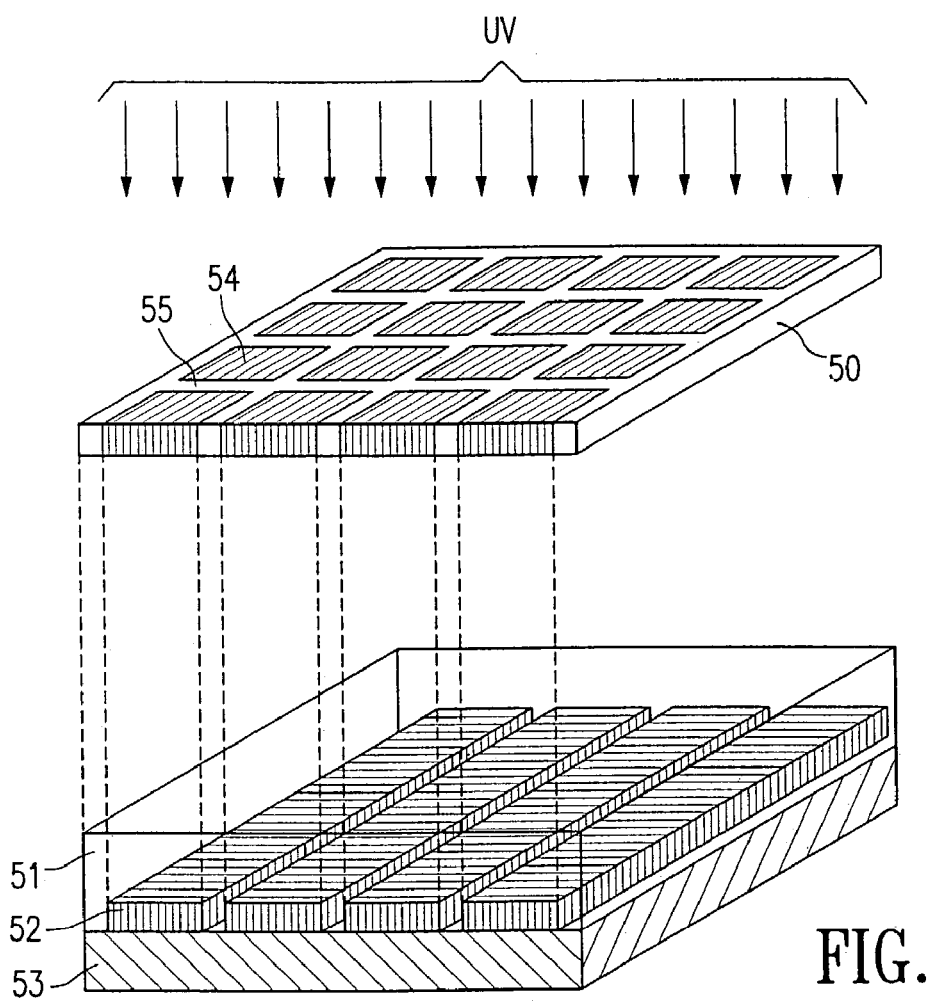
FIG. 5a1
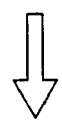
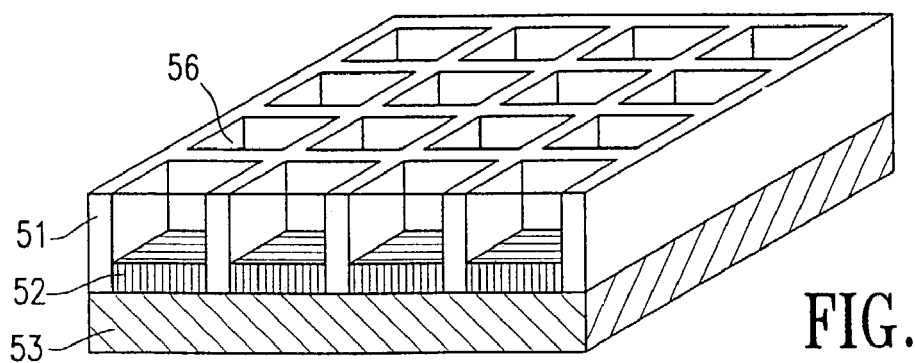
FIG. 5a2

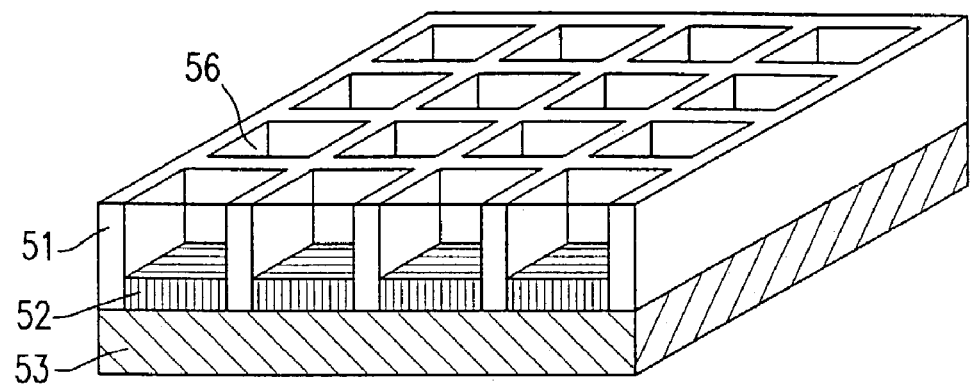
FIG. 5b2
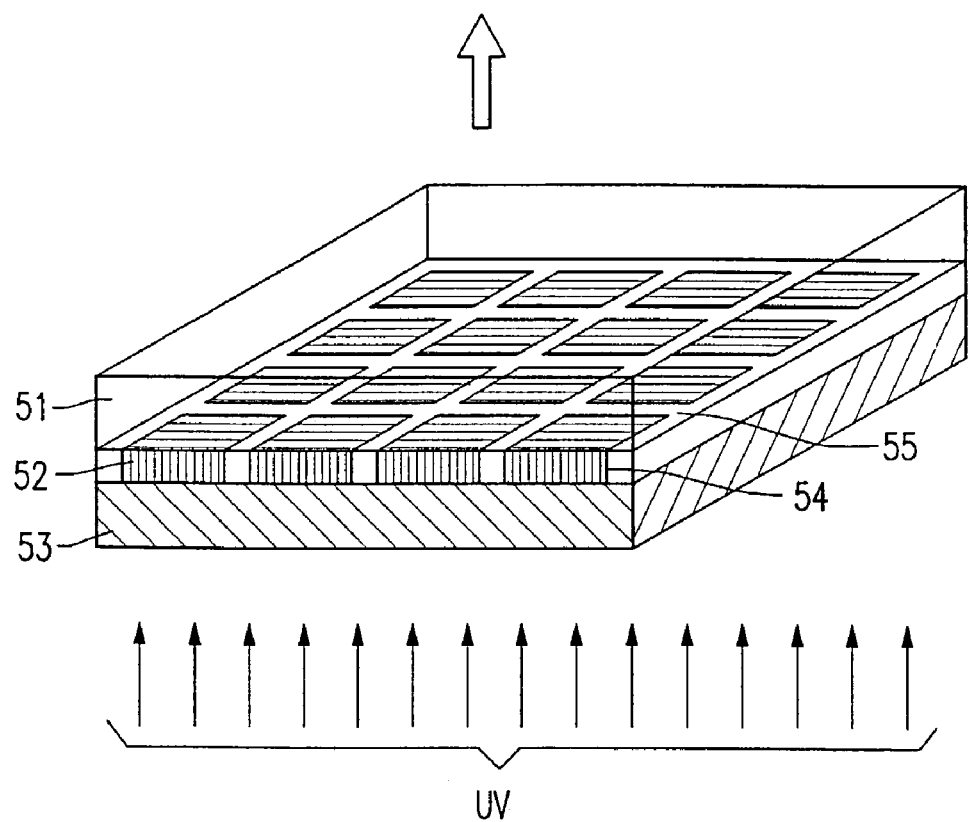
FIG. 5b1

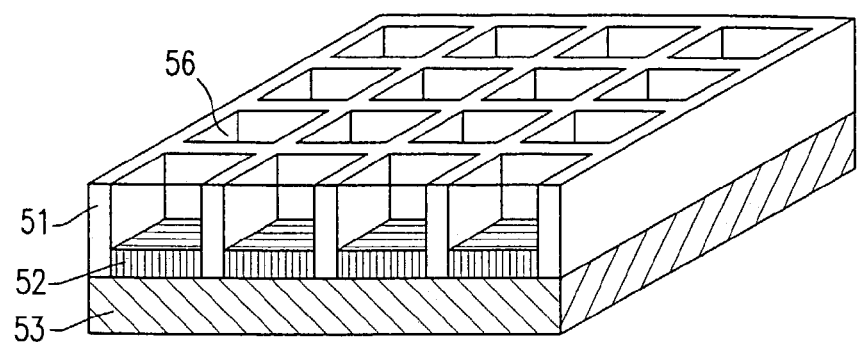
FIG. 5c2
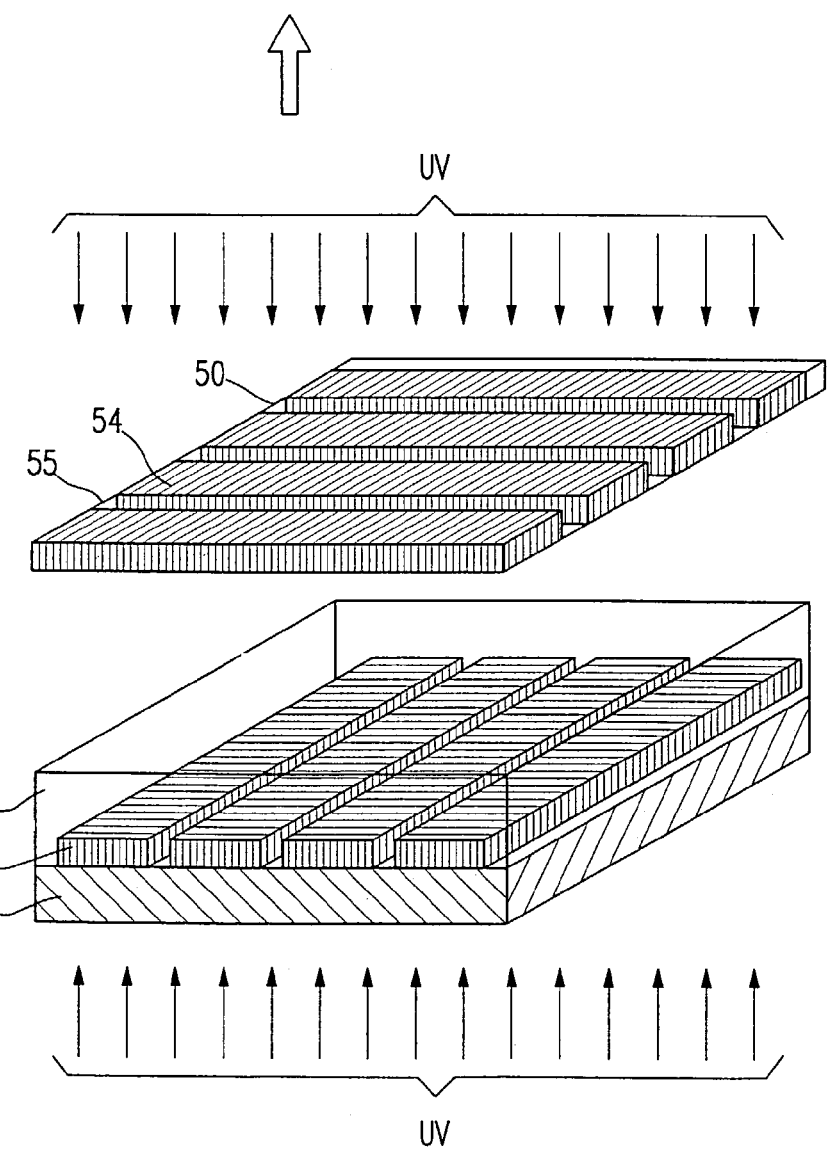
FIG. 5c1

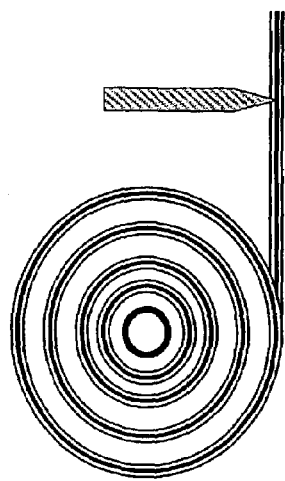
Figure 8a
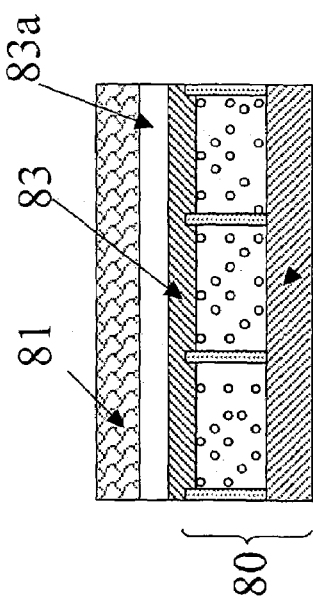
Figure 8b
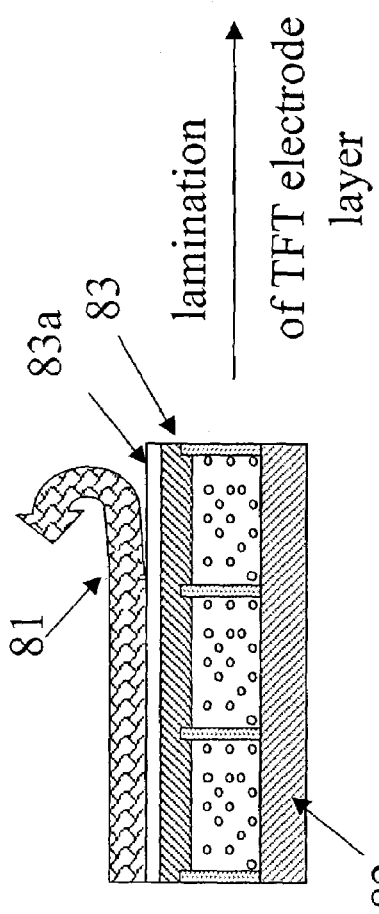
Figure 8c
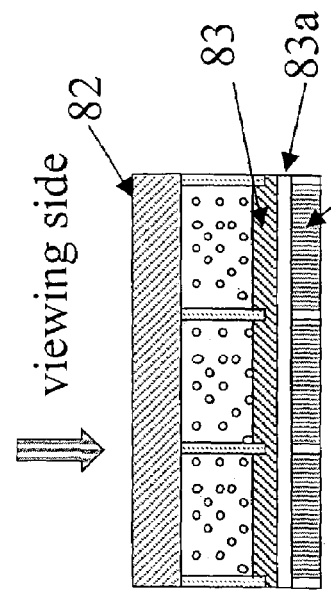
Figure 8d
Figure 8

ELECTROPHORETIC DISPLAY AND NOVEL PROCESS FOR ITS MANUFACTURE

CROSS-REFERENCE TO RELATED APPLICATIONS

This application is a continuation-in-part of U.S. Ser. No. 09/518,488, filed on Mar. 3, 2000 now U.S. Pat. No. 6,930,818, the content of which is incorporated herein by reference in its entirety.

BACKGROUND OF THE INVENTION a) Field of the Invention

This invention is directed to electrophoretic displays and semi-finished display panels comprising display cells prepared from the microcup and top-sealing technologies.

b) Description of Related Art

The electrophoretic display is a non-emissive device based on the electrophoresis phenomenon of charged pigment particles suspended in a solvent. It was first proposed in 1969. The display usually comprises two plates with electrodes placed opposing each other, separated by using spacers. One of the electrodes is usually transparent. A suspension composed of a colored solvent and charged pigment particles is enclosed between the two plates. When a voltage difference is imposed between the two electrodes, the pigment particles migrate to one side and then either the color of the pigment or the color of the solvent can be seen according to the polarity of the voltage difference.

In order to prevent undesired movement of the particles, such as sedimentation, partitions between the two electrodes were proposed for dividing the space into smaller cells. However, in the case of partition-type electrophoretic displays, some difficulties were encountered in the formation of the partitions and the process of enclosing the suspension. Furthermore, it was also difficult to keep different colors of suspensions separate from each other in the partition-type electrophoretic display.

Subsequently, attempts were made to enclose the suspension in microcapsules. U.S. Pat. Nos. 5,961,804 and 5,930,026 describe microencapsulated electrophoretic displays. The microcapsule-based display has a substantially two dimensional arrangement of microcapsules each having therein an electrophoretic composition of a dielectric fluid and a suspension of charged pigment particles that visually contrast with the dielectric solvent. The microcapsules can be formed by interfacial polymerization, in-situ polymerization or other known methods such as physical processes, in-liquid curing or simple/complex coacervation. The microcapsules, after their formation, may be injected into a cell housing two spaced-apart electrodes, or "printed" into or coated on a transparent conductor film. The microcapsules may also be immobilized within a transparent matrix or binder that is itself sandwiched between the two electrodes.

The electrophoretic displays, in particular those prepared according to the processes as disclosed in U.S. Pat. Nos. 5,930,026, 5,961,804, and 6,017,584, have many shortcomings. For example, the electrophoretic display manufactured by the microencapsulation process suffers from sensitivity to environmental changes (in particular sensitivity to moisture and temperature) due to the wall chemistry of the microcapsules. Secondly, the electrophoretic display based on the microcapsules has poor scratch resistance due to the thin wall and large particle size of the microcapsules. To improve the handleability of the display, microcapsules are embedded in a large quantity of polymer matrix which results in a slow response time due to the large distance between the two electrodes and a low contrast ratio due to the low payload of pigment particles. It is also difficult to increase the surface charge density on the pigment particles because charge-controlling agents tend to diffuse to the water/oil interface during the microencapsulation process. The low charge density or zeta potential of the pigment particles in the microcapsules also results in a slow response rate. Furthermore, because of the large particle size and broad size distribution of the microcapsules, the electrophoretic display of this type has poor resolution and addressability for color applications.

SUMMARY OF THE INVENTION

One aspect of the present invention is directed to an array of filled and top-sealed display cells of well-defined shape, size and aspect ratio. The cells are filled with an electrophoretic fluid comprising charged particles dispersed in a dielectric solvent and are individually top-sealed with a polymeric sealing layer. The term "top-seal" is intended to refer to a sealing process in which the display fluid is filled and top-sealed in the display cells constructed on a first substrate or electrode layer. In the edge sealing process typically used for display assembling, two substrates or electrode layers and an edge seal adhesive are required to enclose and edge-seal the display fluid in the cell(s). In contrast, in the top-sealing process, the display fluid is enclosed and top-sealed before a second substrate or electrode layer is disposed on to the display cell(s). The polymeric top-sealing layer is preferably formed from a composition comprising a thermoset or thermoplastic precursor.

Another aspect of the invention is directed to an electrophoretic display comprising an array of filled and top-sealed cells sandwiched between two conductor layers or between one conductor layer and one substrate layer.

A further aspect of the invention is directed to a semi-finished display panel comprising an array of filled and top-sealed cells sandwiched between a temporary substrate such as a release liner and a conductor layer, between a temporary substrate and a permanent substrate layer or between two temporary substrates.

For the electrophoretic display, the display cells are top-sealed before the second conductor or substrate layer is assembled onto the display. For the semi-finished display panel, the display cells are top-sealed before the second temporary substrate, conductor layer or permanent substrate layer is assembled onto the display.

Yet a further aspect of the invention relates to a novel process for the manufacture of an electrophoretic display.

Yet a further aspect of the invention is directed to a novel process for the manufacture of a semi-finished display panel.

Yet a further aspect of the invention is directed to a process for converting a semi-finished display panel to an electrophoretic display.

Yet a further aspect of the invention relates to the preparation of display cells of well-defined shape, size and aspect ratio. The cells enclose a suspension of charged pigment particles dispersed in a dielectric solvent and are formed from microcups prepared according to the present invention. Briefly, the process for the preparation of the microcups involves embossing a thermoplastic or thermoset precursor layer coated on a conductor film with a pre-patterned male mold, followed by releasing the mold during or after the thermoplastic or thermoset precursor layer is hardened by radiation, cooling, solvent evaporation or other means. Alternatively, the microcups may be formed from imagewise exposure of the conductor film coated with a radiation curable layer followed by removing the unexposed areas after the exposed areas have become hardened.

Solvent-resistant and thermomechanically stable microcups having a wide range of size, shape, and opening ratio can be prepared by either one of the aforesaid methods. The microcups are then filled with a suspension of charged pigment particles in a dielectric solvent and sealed.

Yet a further aspect of the present invention relates to the sealing of the microcups filled with the electrophoretic fluid containing a dispersion of charged pigment particles in a dielectric fluid. Top-sealing can be accomplished by a variety of ways. One of the preferred embodiments is accomplished by a one-pass method which involves dispersing a top-sealing composition comprising a thermoplastics, thermoset or a precursor thereof in the electrophoretic fluid before the filling step. The top-sealing composition is immiscible with the dielectric solvent and has a specific gravity lower than that of the electrophoretic fluid. After filling, the top-sealing composition phase separates from the electrophoretic fluid and forms a supernatant layer on top of the fluid. The top-sealing of the microcups is then conveniently accomplished by hardening the top-sealing layer by solvent evaporation, interfacial reaction, moisture, heat or radiation. UV radiation is the preferred method to harden the sealing layer, although a combination of two or more curing mechanisms as described above may be used to increase the throughput of sealing.

In another preferred embodiment, the top-sealing can be accomplished by a two-pass method which involves overcoating the electrophoretic fluid with a top-sealing composition comprising a thermoplastic, thermoset or a precursor thereof. The top-sealing composition in this case has a specific gravity which is no greater than that of the electrophoretic fluid. The sealing is then accomplished by hardening the top-sealing composition by solvent evaporation, interfacial reaction, moisture, heat, radiation or a combination of curing mechanisms. These top-sealing processes are especially unique features of the present invention. Additives such as surfactants, leveling agents, fillers, binders, viscosity modifiers (thinning agents or thickeners), co-solvents or antioxidants may be added to the sealing composition to improve the display performance. Dyes or pigments may also be added in the top-sealing layer particularly if the display is viewed from the opposite side.

Yet a further aspect of the present invention relates to a multiple step process for the manufacture of a monochrome electrophoretic display. The processing steps include preparation of the microcups by any one of the methods described above, filling and top-sealing of the microcups and finally laminating the top-sealed array of microcups with a second conductor or substrate layer with an adhesive.

Yet a further aspect of the present invention relates to a process for the manufacture of a full color electrophoretic display by laminating or coating the preformed microcups with a layer of positively working photoresist, selectively opening a certain number of the microcups by imagewise exposing the positive photoresist, followed by developing the resist, filling the opened cups with a colored electrophoretic fluid and top-sealing the filled microcups by one of the top-sealing processes of this invention. These steps may be repeated to create top-sealed microcups filled with electrophoretic fluids of different colors. A second conductor or substrate layer is finally laminated over the filled and top-sealed microcups with an adhesive layer.

In either process for the manufacture of the a monochrome or multi-color display, the addition of the second conductor or a substrate layer may be alternatively accomplished by coating, printing, vapor deposition, sputtering or a combination thereof. A color filter layer or a protective overcoat such as an antiglare protective coating comprising a particulate filler may be applied onto the top-sealed microcups or the second conductor layer to further improve the optical or physicomechanical properties of the finished panel.

These multiple-step processes as disclosed may also be carried out roll-to-roll on a web continuously or semi-continuously. The microcup structure in fact enables a format flexible and efficient roll-to-roll continuous manufacturing. These processes are very cost effective as compared to typical display manufacturing processes.

One advantage of the electrophoretic display (EPD) of this invention is that the microcup wall is in fact a built-in spacer to keep the top and bottom substrates apart at a fixed distance. The mechanical properties and structural integrity of this type of display are significantly better than those of any prior art displays including those manufactured by using spacer particles. In addition, displays involving microcups have desirable mechanical properties including reliable display performance when the display is bent, rolled, or under compression pressure from, for example, a touch screen application. The use of the microcup technology also eliminates the need of an edge seal adhesive to predefine the size of the display panel and confine the display fluid inside a predefined area. The display fluid within a conventional display prepared by the edge sealing adhesive method will leak out completely if the display is cut in any way, or if a hole is drilled through the display. The damaged display will be no longer functional. In contrast, the display fluid within the display prepared by the microcup and the top-sealing technologies is enclosed and isolated in each cell. The microcup display may be cut into almost any dimensions without the risk of damaging the display performance due to the loss of display fluid in the active areas. In other words, the microcup structure enables a format flexible display manufacturing process wherein the process produces a continuous output of displays in a large sheet format which can be cut into any desired sizes.

The isolated microcup or cell structure is particularly important when cells are filled with fluids of different specific properties such as colors and switching rates. Without the microcup structure, it will be very difficult to prevent the fluids in adjacent areas from intermixing or being subject to cross-talk during operation. As a result, the bistable reflective display of this invention also has excellent color addressability and switching performance.

The electrophoretic display prepared according to the present invention is not sensitive to environment, particularly humidity and temperature. The display is thin, flexible, durable, easy-to-handle and format-flexible. The drawbacks of electrophoretic displays prepared by the prior art processes are therefore all eliminated.

BRIEF DESCRIPTION OF THE DRAWINGS

FIGS. 5a–5c show alternative processing steps for preparing the microcups involving imagewise exposure of the conductor film coated with a thermoset precursor to UV radiation.

FIG. 8 depicts a semi-finished display and illustrates how it is converted to a finished electrophoretic display.

DETAILED DESCRIPTION OF THE INVENTION

Definitions

Unless defined otherwise in this specification, all technical terms are used herein according to their conventional definitions as they are commonly used and understood by those of ordinary skill in the art.

The term "microcup" refers to the cup-like indentations created by microembossing or imagewise exposure.

The term "cell", in the context of the present invention, is intended to mean the single unit formed from a sealed microcup. The cells are filled with charged pigment particles dispersed in a solvent or solvent mixture.

The term "well-defined", when describing the microcups or cells, is intended to indicate that the microcup or cell has a definite shape, size and aspect ratio which are pre-determined according to the specific parameters of the manufacturing process.

The term "aspect ratio" is a commonly known term in the art of electrophoretic displays. In this application, it refers to the depth to width or depth to length ratio of the microcups.

The term "top-sealing" is intended to refer to a sealing process in which the display fluid is filled and top-sealed in the display cells constructed on a first substrate or electrode layer. In the conventional edge seal process, two substrates or electrode layers and an edge seal adhesive are required to enclose and edge-seal the display fluid in the cell(s). In contrast, in the top-sealing process, the display fluid is enclosed and top-sealed before a second substrate or electrode layer is disposed on to the display cell(s).

PREFERRED EMBODIMENTS

Figure 1:
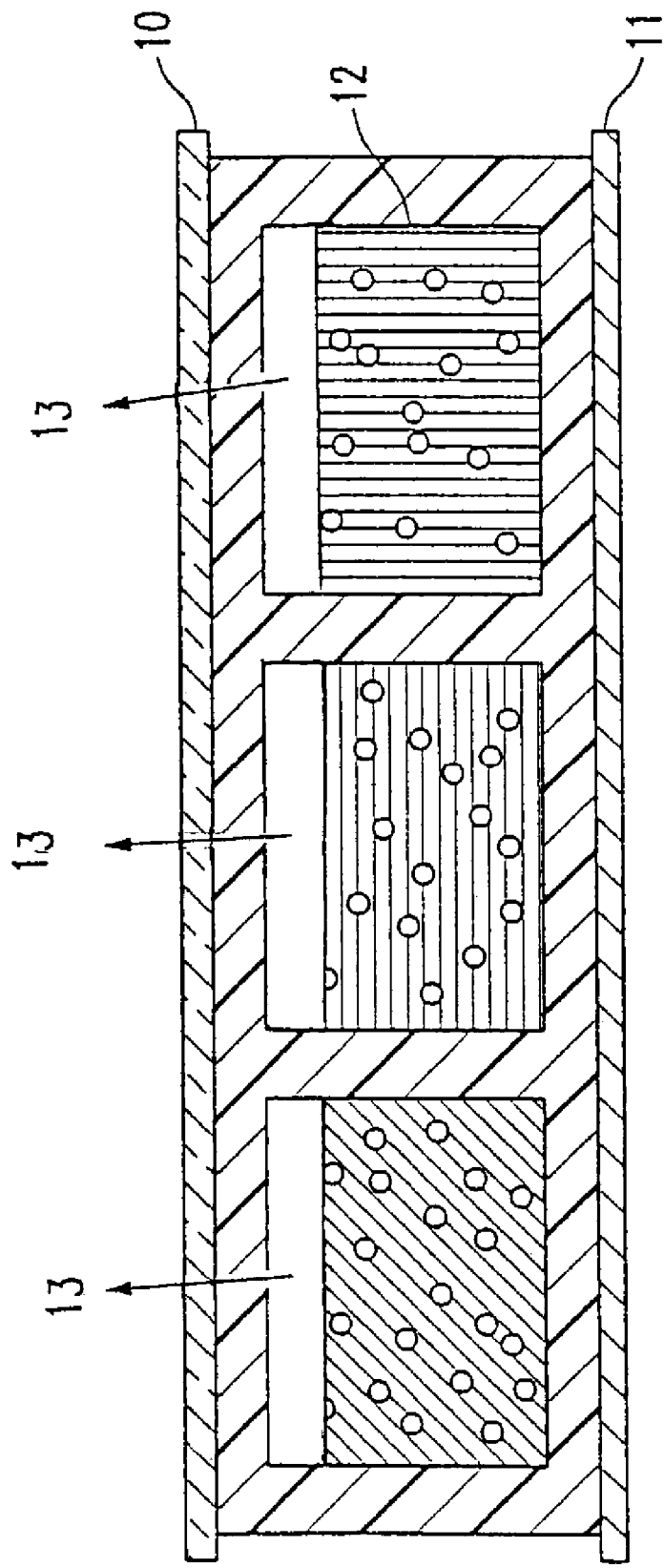
FIG. 1 is a schematic depiction of the electrophoretic display of the present invention.

An electrophoretic display of the present invention, as shown in FIG. 1, comprises two electrode plates (10, 11), at least one of which is transparent (10), and a layer of well-defined cells (12) enclosed between the two electrodes. The cells are filled with charged pigment particles dispersed in a colored dielectric solvent, and individually top-sealed with a polymeric sealing layer (13). When a voltage difference is imposed between the two electrodes, the charged particles migrate to one side, such that either the color of the pigment or the color of the solvent is seen through the transparent conductor film. At least one of the two conductors is patterned. The process for the preparation of such an electrophoretic display involves several aspects.

I. Preparation of the Microcups

I(a) Preparation of the Microcups by Embossing

Figure 2A:
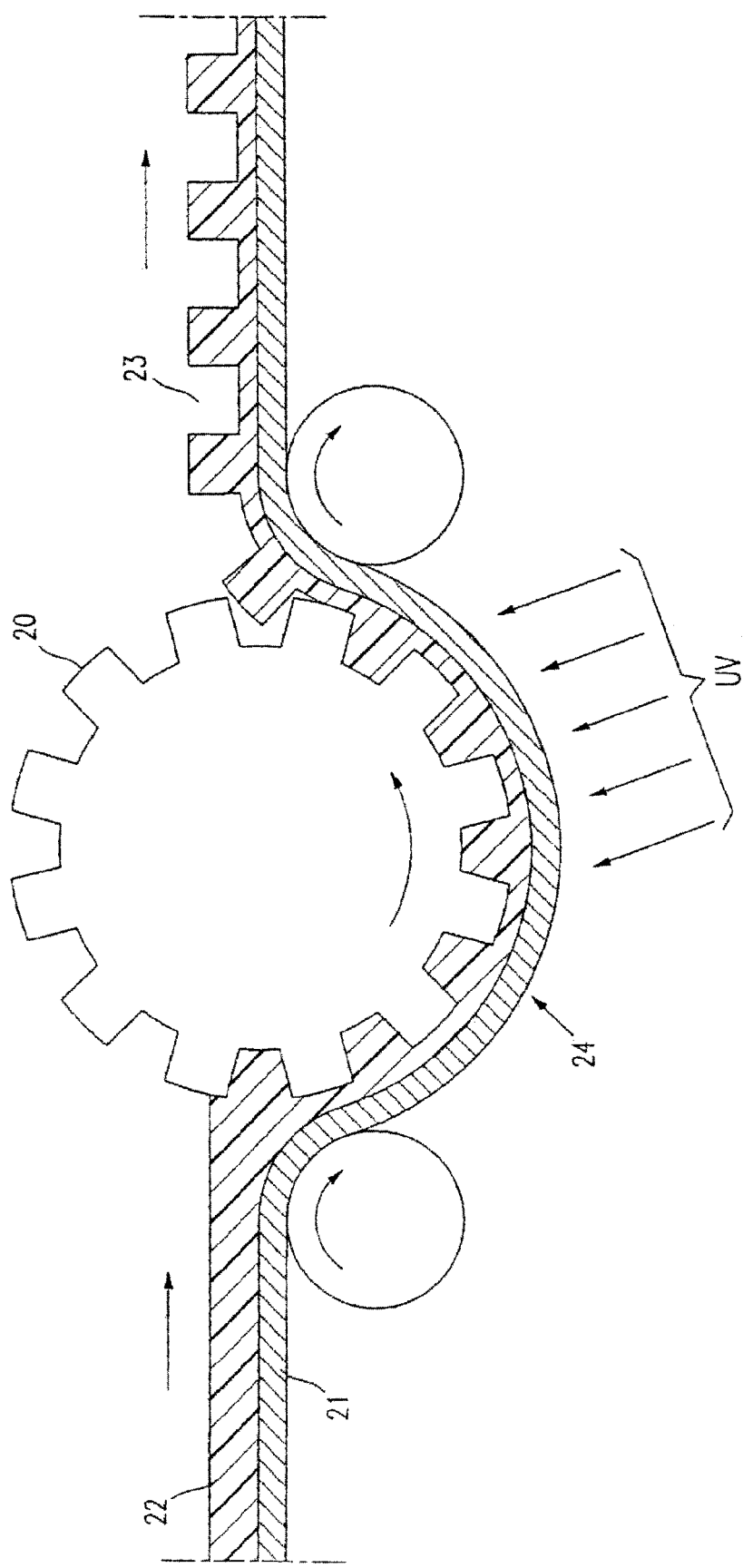
FIGS. 2a and 2b show the roll-to-roll process for the manufacture of an electrophoretic display, in particular, the creation of microcups by embossing a conductor film coated with a UV curable composition.
Figure 2B:
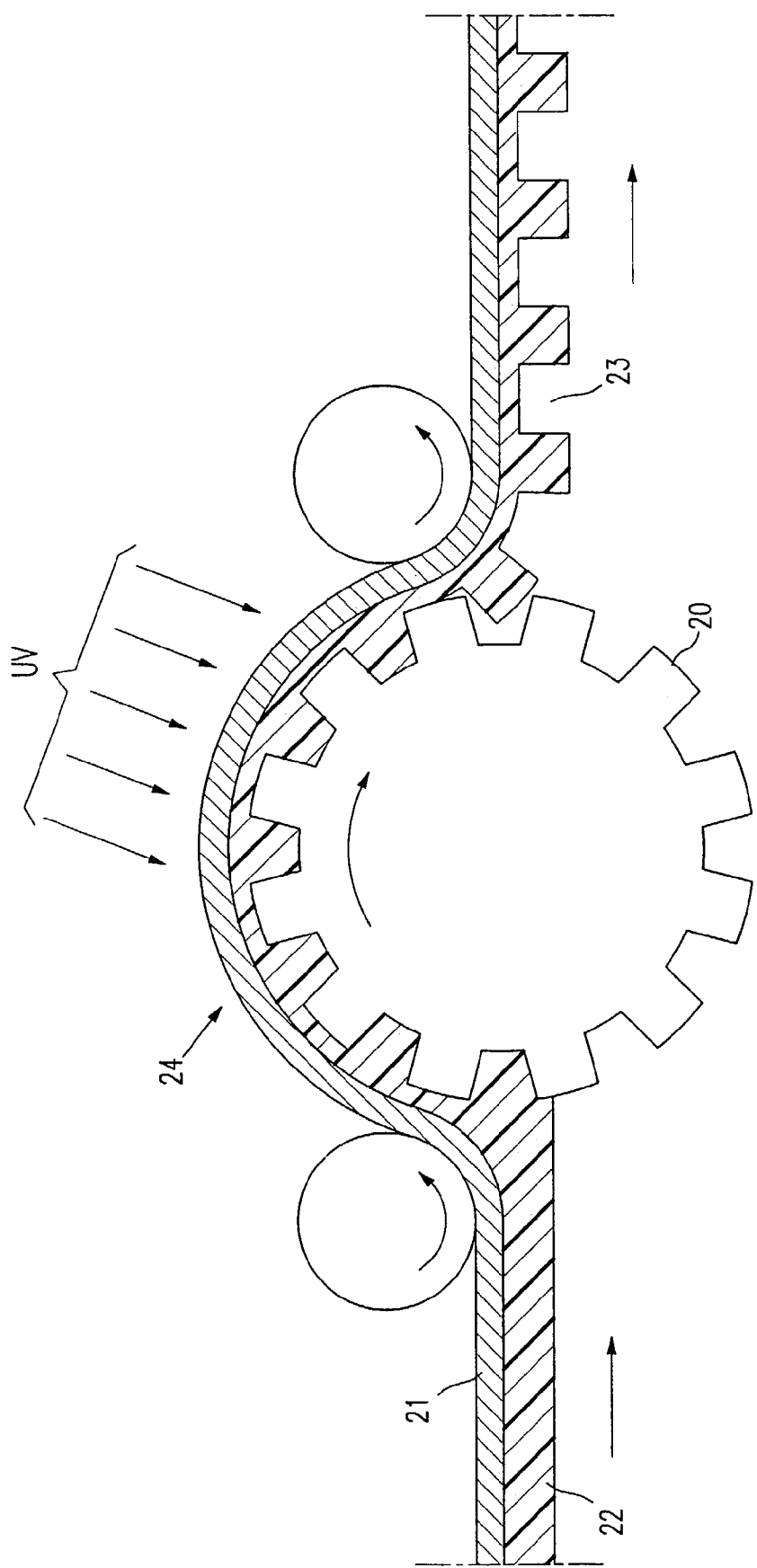

This processing step is shown in FIGS. 2a and 2b. The male mold (20) may be placed either above (FIG. 2a) or below (FIG. 2b) the web (24). The transparent conductive substrate is constructed by forming a transparent conductor film (21) on a glass plate or a plastic substrate. A composition comprising a thermoplastic, thermoset, or a precursor thereof (22) is then coated on the conductor film. The thermoplastic or thermoset precursor layer is embossed at a temperature higher than the glass transition temperature of the thermoplastics or thermoset precursor layer by the male mold in the form of a roller, plate or belt.

The thermoplastics or thermoset precursor for the preparation of the microcups may be multifunctional acrylate or methacrylate, vinylether, epoxide and their oligomers, polymers and the like. Multifunctional acrylate and their oligomers are the most preferred. A combination of multifunctional epoxide and multifunctional acrylate is also very useful to achieve desirable physicomechanical properties. A crosslinkable oligomer imparting flexibility, such as urethane acrylate or polyester acrylate, is usually also added to improve the flexure resistance of the embossed micro-cups. The composition may contain polymer, oligomer, monomer and additives or only oligomer, monomer and additives. The glass transition temperatures (or Tg) for this class of materials usually range from about −70° C. to about 150° C., preferably from about −20° C. to about 50° C. The microembossing process is typically carried out at a temperature higher than the Tg. A heated male mold or a heated housing substrate against which the mold presses may be used to control the microembossing temperature and pressure.

As shown in FIGS. 2a and 2b, the mold is released during or after the precursor layer is hardened to reveal an array of microcups (23). The hardening of the precursor layer may be accomplished by cooling, solvent evaporation, cross-linking by radiation, heat or moisture. If the curing of the thermoset precursor is accomplished by UV radiation, UV may radiate onto the transparent conductor film from the bottom or the top of the web as shown in the two figures. Alternatively, UV lamps may be placed inside the mold. In this case, the mold must be transparent to allow the UV light to radiate through the pre-patterned male mold on to the thermoset precursor layer.

Preparation of the Male Mold

Figure 3A:
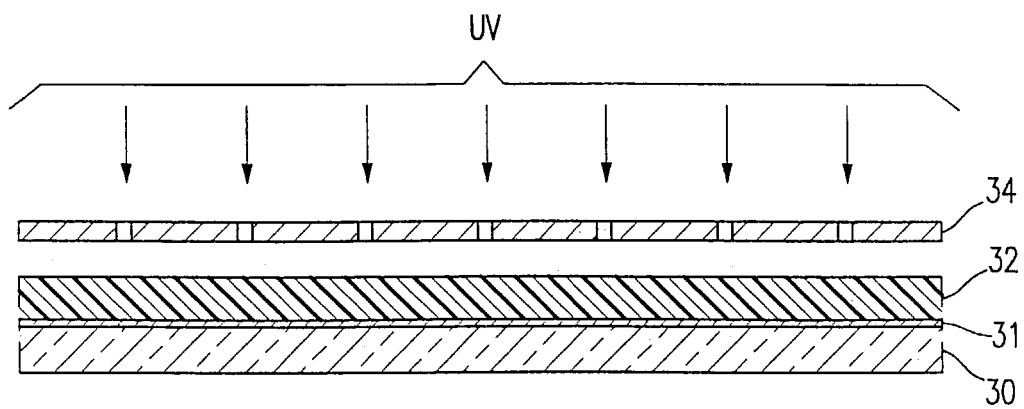
FIGS. 3a–3d illustrate a typical method of preparing the male mold for microembossing.
Figure 3B:
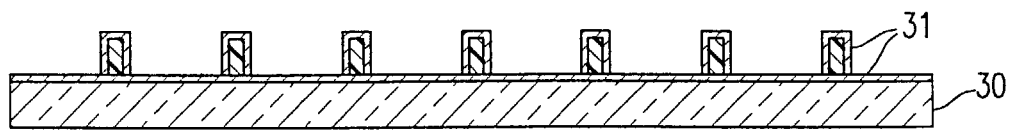
Figure 3C:
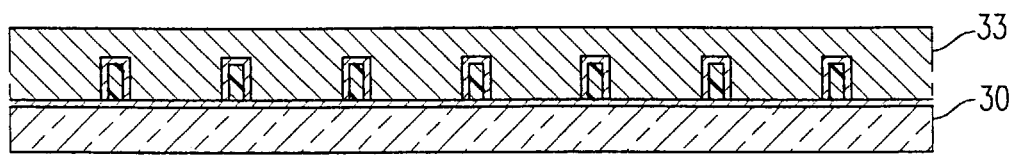
Figure 3D:
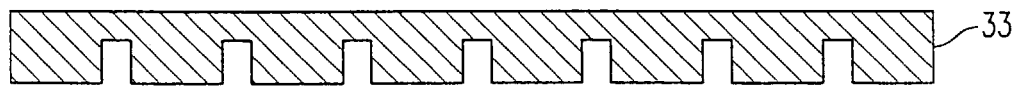

The male mold may be prepared by a photoresist process followed by either etching or electroplating. A representative example for the preparation of the male mold is given in FIG. 3. With electroplating (FIG. 3a), a glass base (30) is sputtered with a thin layer (typically 3000 Å) of a seed metal (31) such as chrome inconel. It is then coated with a layer of photoresist (32) and exposed to UV. A mask (34) is placed between the UV and the layer of photoresist (32). The exposed areas of the photoresist become hardened. The unexposed areas are then removed by washing them with an appropriate solvent. The remaining hardened photoresist is dried and sputtered again with a thin layer of seed metal. The master (FIG. 3b) is then ready for electroforming. A typical material used for electroforming is nickel cobalt (33). Alternatively, the master can be made of nickel by nickel sulfamate electroforming or electroless nickel deposition as described in "Continuous manufacturing of thin cover sheet optical media", SPIE Proc. Vol. 1663, pp. 324 (1992). The floor of the mold (FIG. 3d) is typically between 50 to 400 microns thick. The master can also be made using other microengineering techniques including e-beam writing, dry etching, chemical etching, laser writing or laser interference as described in "Replication techniques for micro-optics", SPIE Proc. Vol. 3099, pp 76–82 (1997). Alternatively, the mold can be made by photomachining using plastics, ceramics or metals.

Figure 4B:
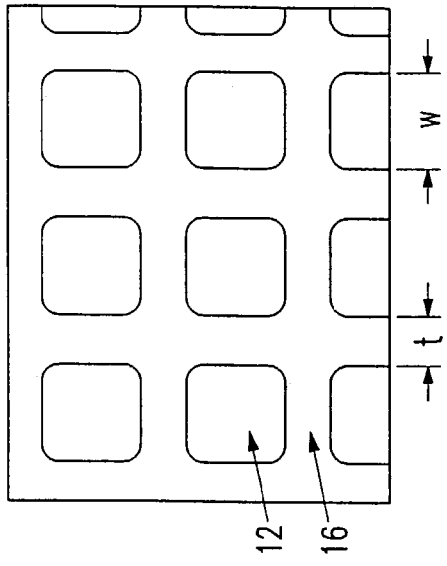
FIGS. 4a–4c show a typical microcup array prepared by microembossing.
Figure 4A:
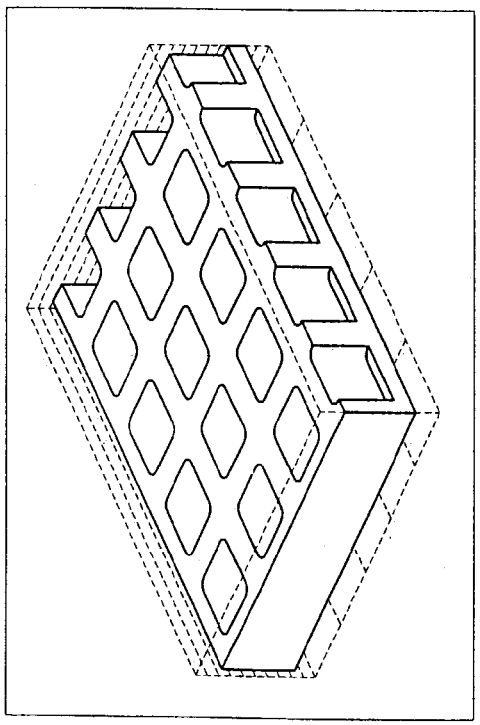
Figure 4C:
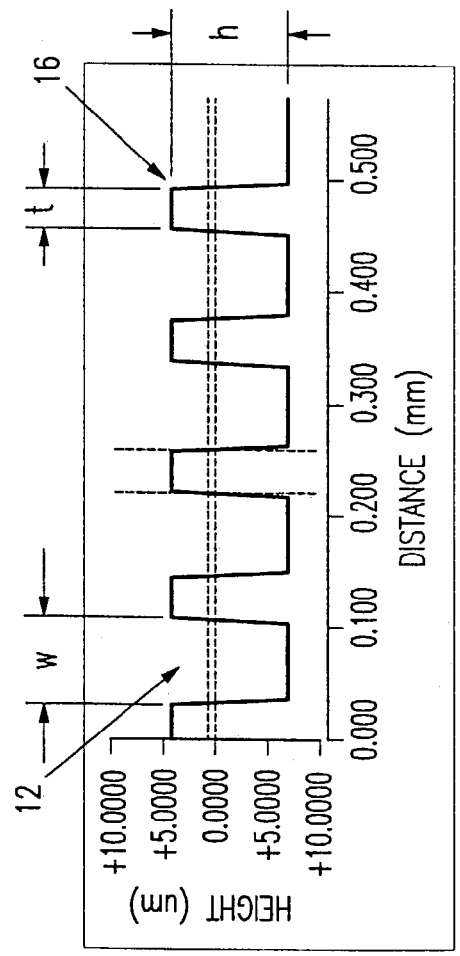

FIG. 4a is an optical profilometry three-dimensional profile of the typical microcups prepared by microembossing. FIG. 4b is an optical microscopic picture showing the openings of the microcups from the top view. FIG. 4c is the optical profilometry vertical cross-section view of a row of microcups showing their depth.

I(b) Preparation of the Microcups by Imagewise Exposure

Alternatively, the microcups may be prepared by imagewise exposure (FIG. 5a) of a radiation curable material (51) coated on the conductor film (52) to UV or other forms of radiation through a mask (50). The conductor film (52) is on a plastic substrate (53).

For a roll-to-roll process, the photomask may be synchronized with the web and move at the same speed as the latter. In the photomask (50) in FIG. 5a, the dark squares (54) represent the opaque area and the space (55) between the dark squares represents the opening area. The UV radiates through the opening area (55) onto the radiation curable material. The exposed areas become hardened and the unexposed areas (protected by the opaque area in the mask) are then removed by an appropriate solvent or developer to form the microcups (56). The solvent or developer is selected from those commonly used for dissolving or reducing the viscosity of radiation curable materials such as methylethylketone, toluene, acetone, isopropanol or the like.

FIGS. 5b and 5c illustrate two other options for the preparation of microcups by imagewise exposure. The features in these two figures are essentially the same as shown in FIG. 5a and the corresponding parts are also numbered the same. In FIG. 5b, the conductor film (52) used is opaque and pre-patterned. In this case, it may be advantageous to imagewise expose the radiation sensitive material through the conductor pattern which serves as the photomask. The microcups (56) can then be formed by removing the unexposed areas after UV radiation. In FIG. 5c, the conductor film (52) is also opaque and line-patterned. The radiation curable material is exposed from the bottom through the conductor line pattern (52) which serves as the first photomask. A second exposure is performed from the other side through the second photomask (50) having a line pattern perpendicular to the conductor lines. The unexposed area is then removed by a solvent or developer to reveal the microcups (56).

In general, the microcups can be of any shape, and their sizes and shapes may vary. The microcups may be of substantially uniform size and shape in one system. However, in order to maximize the optical effect, microcups having a mixture of different shapes and sizes may be produced. For example, microcups filled with a dispersion of the red color may have a different shape or size from the green microcups or the blue microcups. Furthermore, a pixel may consist of different numbers of microcups of different colors. For example, a pixel may consist of a number of small green microcups, a number of large red microcups, and a number of small blue microcups. It is not necessary to have the same shape and number for the three colors.

The openings of the microcups may be round, square, rectangular, hexagonal, or any other shape. The partition area between the openings is preferably kept small in order to achieve a high color saturation and contrast while maintaining desirable mechanical properties. Consequently, the honeycomb-shaped opening is preferred over, for example, the circular opening.

For reflective electrophoretic displays, the dimension of each individual microcup may be in the range of about $10^2$ to about $5 \times 10^5$ $\mu m^2$, preferably from about $10^3$ to about $5 \times 10^4$ $\mu m^2$. The depth of the microcups is in the range of about 3 to about 100 microns, preferably from about 10 to about 50 microns. The ratio between the area of opening to the area of cell walls is in the range of from about 0.05 to about 100, preferably from about 0.4 to about 20. The width of the openings usually are in the range of from about 15 to about 450 microns, preferably from about 25 to about 300 microns from edge to edge of the openings.

II. Preparation of the Suspension/Dispersion

The microcups are filled with charged pigment particles dispersed in a dielectric solvent. The dispersion may be prepared according to methods well known in the art such as U.S. Pat. Nos. 6,017,584, 5,914,806, 5,573,711, 5,403,518, 5,380,362, 4,680,103, 4,285,801, 4,093,534, 4,071,430, 3,668,106 and IEEE Trans. Electron Devices, ED-24, 827 (1977), and J. Appl. Phys. 49(9), 4820 (1978). The charged pigment particles visually contrast with the medium in which the particles are suspended. The medium is a dielectric solvent which preferably has a low viscosity and a dielectric constant in the range of about 1 to about 30, preferably about 1.5 to about 15 for high particle mobility. Examples of suitable dielectric solvents include hydrocarbons such as decahydronaphthalene (DECALIN), 5-ethylidene-2-norbornene, fatty oils, paraffin oil, aromatic hydrocarbons such as toluene, xylene, phenylxylylethane, dodecylbenzene and alkylnaphthalene, halogenated solvents such as perfluorodecalin, perfluorotoluene, perfluoroxylene, dichlorobenzotrifluoride, 3,4,5-trichlorobenzotrifluoride, chloropentafluoro-benzene, dichlorononane, pentachlorobenzene, and perfluoro solvents such as FC-43™, FC-70™ and FC-5060™ from 3M Company, St. Paul Minn., low molecular weight halogen containing polymers such as poly(perfluoropropylene oxide) from TCI America, Portland, Oreg., poly(chlorotrifluoroethylene) such as Halocarbon Oils from Halocarbon Product Corp., River Edge, N.J., perfluoropolyalkylether such as Galden™ from Ausimont or Krytox™ Oils and Greases K-Fluid Series from DuPont, Delaware. In one preferred embodiment, poly(chlorotrifluoroethylene) is used as the dielectric solvent. In another preferred embodiment, poly(perfluoropropylene oxide) is used as the dielectric solvent.

In addition to the charged primary pigment particles such as $TiO_2$ particles, the electrophoretic fluid may be colored by a contrasting colorant. The contrast colorant may be formed from dyes or pigments. Nonionic azo, anthraquinone and phthalocyanine dyes or pigments are particularly useful. Other examples of useful dyes include, but are not limited to: Oil Red EGN, Sudan Red, Sudan Blue, Oil Blue, Macrolex Blue, Solvent Blue 35, Pylam Spirit Black and Fast Spirit Black from Pylam Products Co., Arizona, Sudan Black B from Aldrich, Thermoplastic Black X-70 from BASF, anthraquinone blue, anthraquinone yellow 114, anthraquinone reds 111 and 135 and anthraquinone green 28 from Aldrich. In case of an insoluble pigment, the pigment particles for generating the color of the medium may also be dispersed in the dielectric medium. These color particles are preferably uncharged. If the pigment particles for generating color in the medium are charged, they preferably carry a charge which is opposite from that of the charged pigment particles. If both types of pigment particles carry the same charge, then they should have different charge density or different electrophoretic mobility. In any case, the dye or pigment for generating color of the medium must be chemically stable and compatible with other components in the suspension.

The charged pigment particles may be organic or inorganic pigments, such as $TiO_2$, phthalocyanine blue, phthalocyanine green, diarylide yellow, diarylide AAOT Yellow, and quinacridone, azo, rhodamine, perylene pigment series from Sun Chemical, Hansa yellow G particles from Kanto Chemical, and Carbon Lampblack from Fisher. Submicron particle size is preferred. The particles should have acceptable optical characteristics, should not be swollen or softened by the dielectric solvent, and should be chemically stable. The resulting suspension must also be stable against sedimentation, creaming or flocculation under normal operating conditions.

The pigment particles may exhibit a native charge, or may be charged explicitly using a charge control agent, or may acquire a charge when suspended in the dielectric solvent. Suitable charge control agents are well known in the art; they may be polymeric or non-polymeric in nature, and may also be ionic or non-ionic, including ionic surfactants such as Aerosol OT, sodium dodecylbenzenesulfonate, metal soap, polybutene succinimide, maleic anhydride copolymers, vinylpyridine copolymers, vinylpyrrolidone copolymer (such as Ganex™ from International Specialty Products), (meth)acrylic acid copolymers, and N,N-dimethylaminoethyl (meth)acrylate copolymers. Fluorosurfactants are particularly useful as charge controlling agents in fluorocarbon solvents. These include FC fluorosurfactants such as FC-170C™, FC-171™, FC-176™, FC430™, FC431™ and FC-740™ from 3M Company and Zonyl™ fluorosurfactants such as Zonyl™ FSA, FSE, FSN, FSN-100, FSO, FSO-100, FSD and UR from Dupont.

Suitable charged pigment dispersions may be manufactured by any of the well-known methods including grinding, milling, attriting, microfluidizing, and ultrasonic techniques. For example, pigment particles in the form of a fine powder are added to the suspending solvent and the resulting mixture is ball milled or attrited for several hours to break up the highly agglomerated dry pigment powder into primary particles. Although less preferred, a dye or pigment for generating color of the suspending medium may be added to the suspension during the ball milling process.

Sedimentation or creaming of the pigment particles may be eliminated by microencapsulating the particles with suitable polymers to match the specific gravity to that of the dielectric solvent. Microencapsulation of the pigment particles may be accomplished chemically or physically. Typical microencapsulation processes include interfacial polymerization, in-situ polymerization, phase separation, coacervation, electrostatic coating, spray drying, fluidized bed coating and solvent evaporation.

For a black/white electrophoretic display, the suspension comprises charged white particles of titanium oxide ($TiO_2$) dispersed in a black solvent or charged black particles dispersed in a dielectric solvent. A black dye or dye mixture such as Pylam™ Spirit Black and Fast Spirit Black from Pylam Products Co. Arizona, Sudan Black B from Aldrich, Thermoplastic Black X-70™ from BASF, or an insoluble black pigment such as carbon black may be used to generate the black color of the solvent. Carbonaceous particles, particularly submicron carbonaceous particles, prepared from organic compounds such as coal tar, petroleum pitch or resins by a high temperature carbonizing process as taught in U.S. Pat. Nos. 5,332,517 and 5,693,367 may also be used as the black colorant. For other colored suspensions, there are many possibilities. For a subtractive color system, the charged $TiO_2$ particles may be suspended in a dielectric solvent of cyan, yellow or magenta color. The cyan, yellow or magenta color may be generated via the use of a dye or a pigment. For an additive color system, the charged $TiO_2$ particles may be suspended in a dielectric solvent of red, green or blue color generated also via the use of a dye or a pigment. The red, green, blue color system is preferred for most applications.

III. Top-Sealing of the Microcups

The top-sealing of the microcups may be accomplished in a number of ways. In one embodiment, a top-sealing composition is dispersed into an electrophoretic fluid. The top-sealing composition comprises a material selected from the group consisting of polyvalent acrylates or methacrylates, cyanoacrylates, polyvalent vinyls including vinylbenzene, vinylsilane, vinylether, polyvalent epoxides, polyvalent isocyanates, polyvalent allyls, oligomers or polymers containing crosslinkable functional groups, and the like. The top-sealing composition may further comprise additives such as a polymeric binder or thickener, photoinitiator, catalyst, filler, colorant or surfactant. The top-sealing composition and the electrophoretic fluid containing charged pigment particles dispersed in a colored dielectric solvent are thoroughly blended by, for example, an in-line mixer and immediately coated onto the microcups with a precision coating mechanism such as Myrad bar, gravure, doctor blade, slot coating or slit coating. If desired, excess fluid is scraped away by a wiper blade or a similar device. A small amount of a weak solvent or solvent mixture such as isopropanol, methanol or an aqueous solution thereof may be used to clean the residual electrophoretic fluid on the top surface of the partition walls of the microcups. The sealing composition is immiscible with the dielectric solvent and has a specific gravity lower than that of the dielectric solvent and the pigment particles. Volatile organic solvents may be used to control the viscosity and coverage of the electrophoretic fluid. The thus-filled microcups are then dried and the top-sealing composition floats to the top of the electrophoretic fluid. The microcups may be seamlessly top-sealed by hardening the supernatant sealing layer by, for example, UV, during its separation or after it floats to the top. Other forms of radiation such as visible light, IR and electron beam may be used to cure and seal the microcups. Alternatively, heat or moisture may also be employed to dry, harden and seal the microcups, if heat or moisture curable compositions were used.

A preferred group of dielectric solvents exhibiting desirable density and solubility discrimination against acrylate monomers and oligomers are halogenated hydrocarbons particularly fluorinated and perfluorinated solvents and their derivatives. Surfactants may be used to improve the adhesion and wetting at the interface between the electrophoretic fluid and the sealing materials. Useful surfactants include the FC™ surfactants from 3M Company, Zonyl™ fluorosurfactants from DuPont, fluoroacrylates, fluoromethacrylates, fluoro-substituted long chain alcohols, perfluoro-substituted long chain carboxylic acids and their derivatives.

Alternatively, the electrophoretic fluid and the top-sealing composition may be coated sequentially into the microcups, particularly when it is at least partially compatible with the dielectric solvent. Thus, the top-sealing of the microcups may be accomplished by overcoating a thin layer of a top-sealing composition comprising a material selected from the group consisting of polyvalent acrylates or methacrylates, cyanoacrylates, polyvalent vinyls including vinylbenzene, vinylsilane, vinylether, polyvalent epoxides, polyvalent isocyanates, polyvalent allyls, oligomers or polymers containing crosslinkable functional groups, and the like. The material may be curable by radiation, heat, moisture or an interfacial reaction and curing on the surface of the filled microcups. Interfacial polymerization followed by UV curing is very beneficial to the top-sealing process. Intermixing between the electrophoretic layer and the overcoat is significantly suppressed by the formation of a thin barrier layer at the interface by interfacial polymerization. The top-sealing is then completed by a post curing step, preferably by UV radiation. To further reduce the degree of intermixing, it is highly desirable that the specific gravity of the overcoating is no greater than that of the electrophoretic fluid. Volatile organic solvents may be used to adjust the viscosity and the thickness of the coating. When a volatile solvent is used in the overcoat, it is preferred that it is immiscible with the dielectric solvent. This two-pass overcoating process is particularly useful when the colorant used in the electrophoretic fluid is at least partially compatible with the top-sealing composition. Additives or fillers such as surfactants, antioxidants, crosslinkers, thickeners, and polymer binders may also be used to improve the performance or processability. Pigments, dyes, or fillers such as silica, $CaCO_3$, $BaSO_4$, $TiO_2$, metal particles and their oxides, carbon black, may also be used particularly when the display is viewed from the opposite side.

IV. Preparation of Monochrome Electrophoretic Displays

Figure 6:
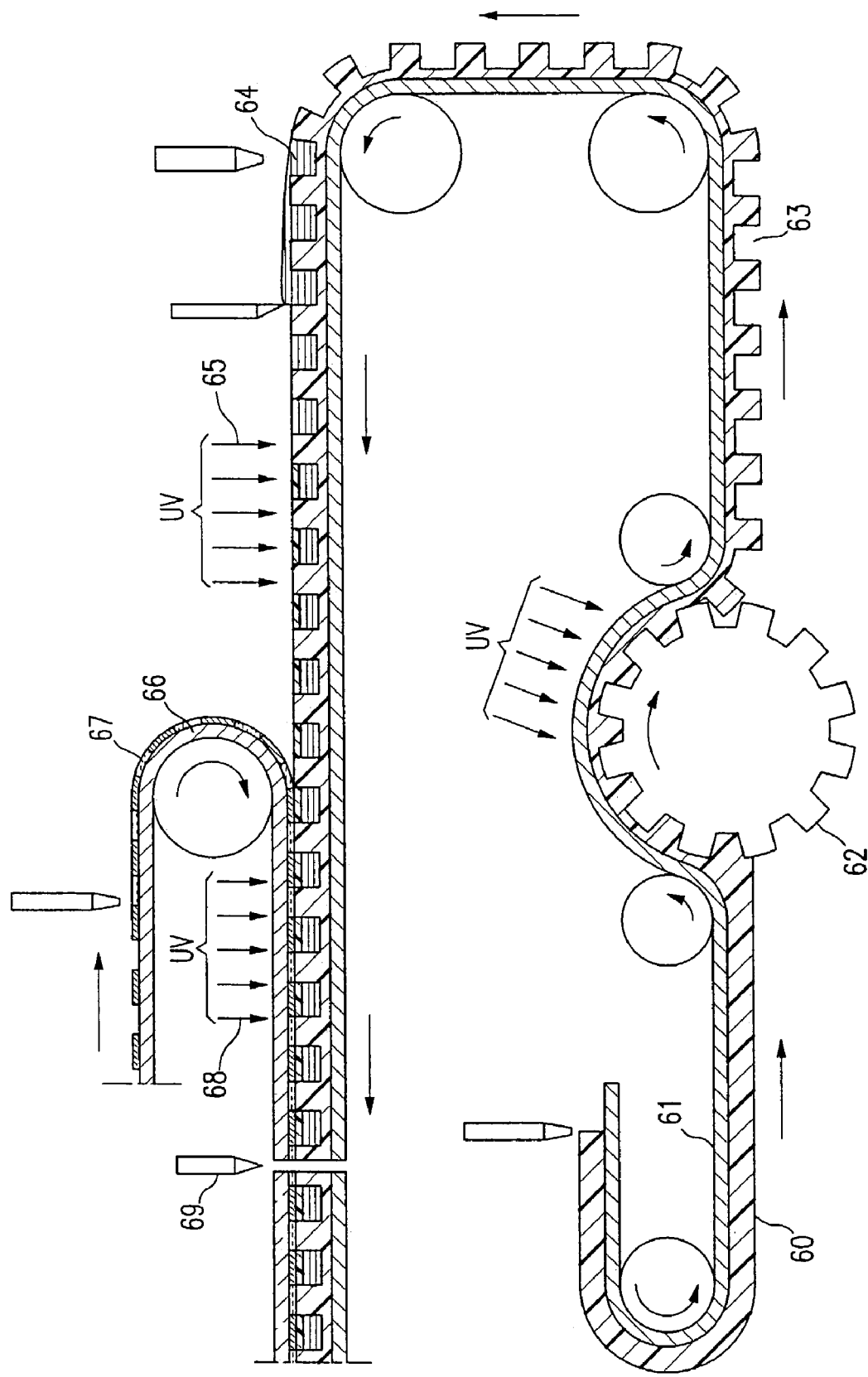
FIG. 6 is a flow chart for manufacturing a black/white electrophoretic display or other single color electrophoretic displays.

The process is illustrated by the flow diagram as shown in FIG. 6. All microcups are filled with a suspension of the same color composition. The process can be a continuous roll-to-roll process comprising the following steps:

1. Coat a layer of a thermoplastic, thermoset or a precursor thereof (60) optionally with a solvent on a conductor film (61). The solvent, if present, readily evaporates.

2. Emboss the layer (60) at a temperature higher than the glass transition temperature of the layer by a pre-patterned male mold (62).

3. Release the mold from the layer (60) preferably during or after it is hardened by proper means.

4. Fill in the thus-formed array of microcups (63) with a charged pigment dispersion (64) in a colored dielectric solvent containing a top-sealing composition which is incompatible with the solvent and has a lower specific gravity than the electrophoretic fluid.

5. Seal the microcups by hardening the top-sealing composition preferably by radiation such as UV (65), or by heat or moisture during or after the top-sealing composition separates and forms a supernatant layer on top of the liquid phase, thus forming closed electrophoretic cells containing electrophoretic fluid.

6. Laminate the top-sealed array of electrophoretic cells with a second conductor film or a substrate layer (66) pre-coated with an adhesive layer (67) which may be a pressure sensitive adhesive, a hot melt adhesive, a heat, moisture, or radiation curable adhesive. Preferred materials for the adhesive include acrylics, styrene-butadiene copolymers, styrene-butadiene-styrene block copolymers, styrene-isoprene-styrene block copolymers, polyvinylbutyal, cellulose acetate butyrate, polyvinylpyrrolidone, polyurethanes, polyamides, ethylene-vinylacetate copolymers, epoxides, multifunctional acrylates, vinyls, vinylethers, and their oligomers, polymers, and copolymers.

The laminated adhesive may be post cured by radiation such as UV (68) through the top conductor film if the latter is transparent to the radiation. The finished product may be cut (69) after the lamination step.

Alternatively, the second conductor or substrate layer (66) may be disposed onto the top-sealed microcups by a method such as coating, printing, vapor deposition, sputtering or a combination thereof. A color filter or protective overcoat such as an antiglare protective coating comprising a particulate filler may be applied onto the top-sealed microcups or the second electrode layer to improve the optical or physicomechanical properties of the finished panel.

The preparation of the microcups described above can be conveniently replaced by the alternative procedure of imagewise exposing the conductor film coated with a radiation curable composition followed by removing the unexposed areas by an appropriate solvent.

In one embodiment, the top-sealing of the microcups may alternatively be accomplished by first partially filling the microcup array with the electrophoretic fluid and then directly overcoating and hardening the top-sealing composition over the surface of the fluid. This two-pass overcoating sealing process is particularly useful when the colorant of the electrophoretic fluid is partially compatible with the top-sealing composition.

V. Preparation of Multi-Color Electrophoretic Displays

For the manufacture of a multi-color electrophoretic display, additional steps are needed to generate microcups containing suspensions of different colors. These additional steps include (1) laminating the already formed microcups with a positively working dry-film photoresist consisting of at least a removable support such as PET-4851™ from Saint-Gobain, Worcester, Mass., a novolac positive photoresist such as Microposit S1818™ from Shipley, and an alkali-developable adhesive layer such as a mixture of Nacor 72-8685™ from National Starch and Carboset 515™ from BF Goodrich; (2) selectively opening a certain amount of the microcups by imagewise exposing the photoresist, removing the removable support film, and developing the positive photoresist with a developer such as diluted Microposit 351™ developer from Shipley; (3) filling the opened cups with the electrophoretic fluid containing charged white pigment ($TiO_2$) particles and dye or pigment of the first primary color; and (4) top-sealing the filled microcups as described in the preparation of monochrome displays. These additional steps may be repeated to create microcups filled with electrophoretic fluid of the second and the third primary colors. Alternatively, the positively working resist may be applied to the unfilled microcup array by a conventional wet coating process.

More specifically, a multi-color electrophoretic displays may be prepared according to the steps as shown in FIG. 7:

1. Coat a layer of a thermoplastic, thermoset, or a precursor thereof (70) on a conductor film (71).

2. Emboss the layer (70) at a temperature higher than its glass transition temperature by a pre-patterned male mold (not shown).

3. Release the mold from the layer (70) preferably during or after it is hardened by solvent evaporation, cooling or crosslinking by radiation, heat or moisture.

4. Laminate the thus formed array of microcups (72) with a dry film positive photoresist which comprises at least an adhesive layer (73), a positive photoresist (74) and a removable plastic cover sheet (not shown).

Figure 7A:
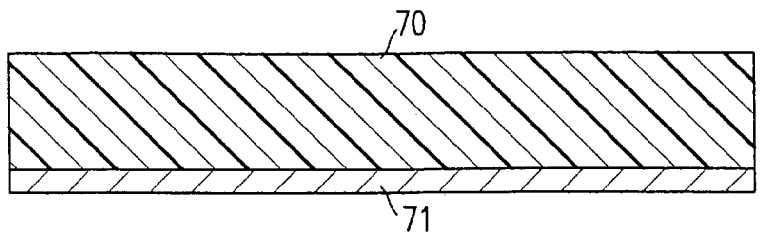
FIGS. 7a–7h are a flow chart for manufacturing a multicolor electrophoretic display.
Figure 7B:
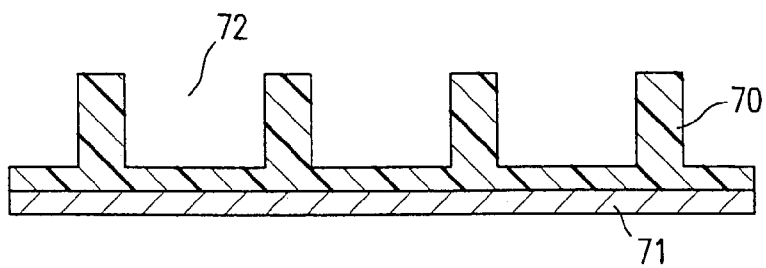
Figure 7C:
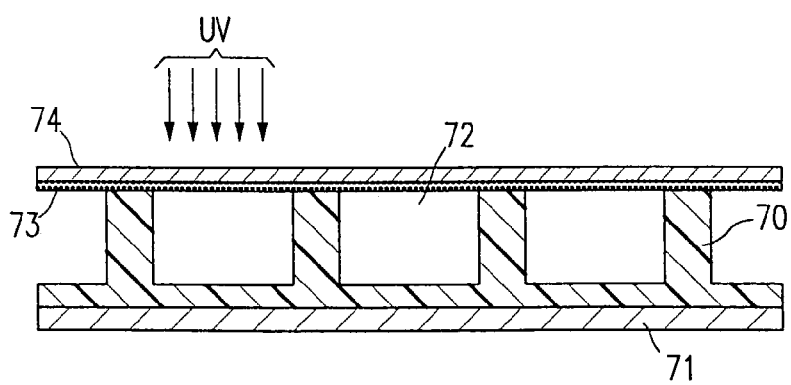
Figure 7D:
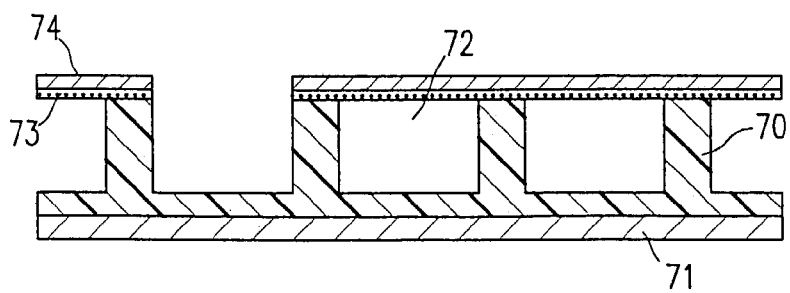

5. Imagewise expose (FIG. 7c) the positive photoresist by UV, visible light, or other radiation, remove the cover sheet, develop and open cups in the exposed area. The purpose of Steps 4 and 5 is to selectively open the microcups in a predetermined area (FIG. 7d).

6. Fill in the opened microcups with a charged white pigment dispersion (75) in a dielectric solvent containing at least a dye or pigment of the first primary color and a top-sealing composition (76) which is incompatible with the electrophoretic fluid and has a lower specific gravity than the solvent or the pigment particles.

Figure 7E:
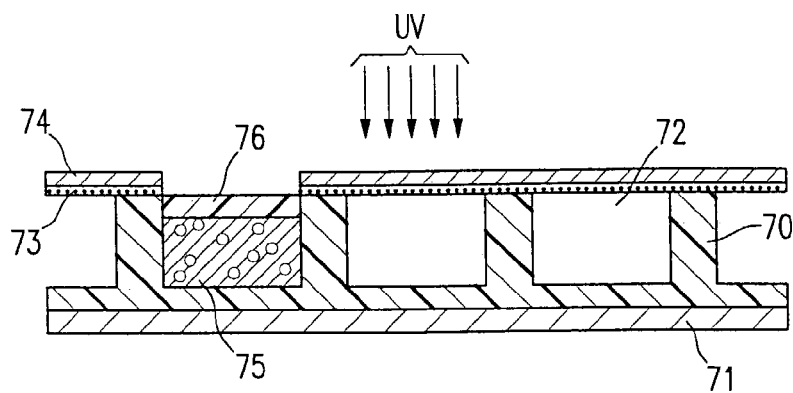

7. Top-seal the microcups to form closed electrophoretic cells containing electrophoretic fluid of the first primary color by hardening the top-sealing composition (preferably by radiation such as UV, less preferably by heat or moisture) during or after the sealing composition separates and forms a supernatant layer on top of the electrophoretic fluid (FIG. 7e).

Figure 7F:
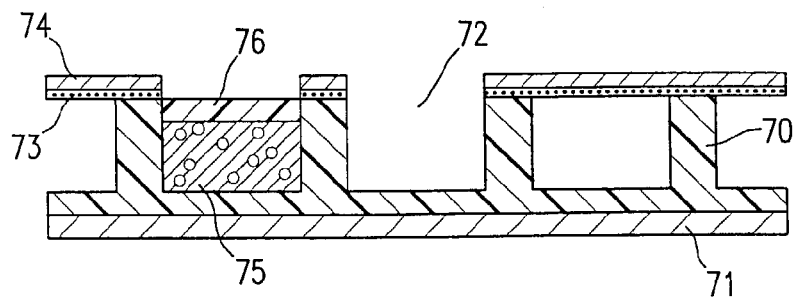
Figure 7G:
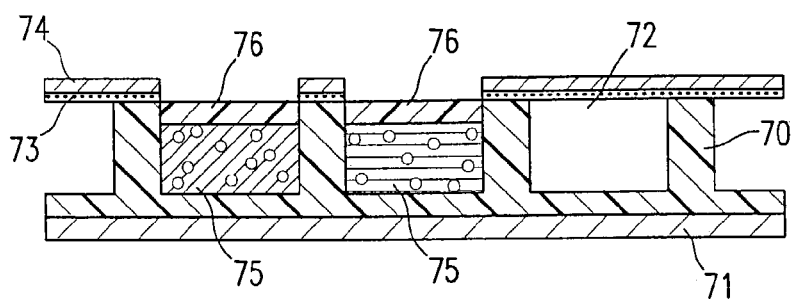
Figure 7H:
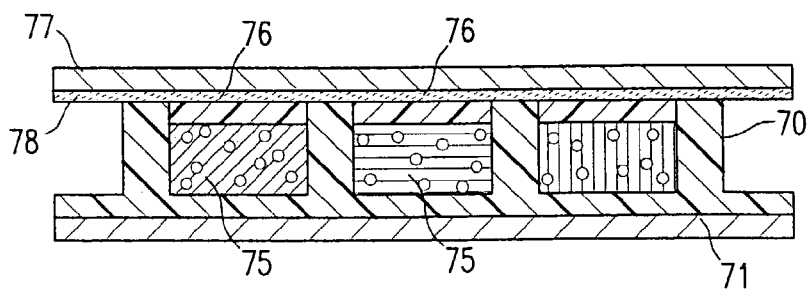

8. Steps 5–7 described above may be repeated to generate well-defined cells containing electrophoretic fluids of different colors in different areas (FIGS. 7e, 7f and 7g).

9. Laminate the top-sealed array of electrophoretic cells in registration to a second, pre-patterned transparent conductor or a substrate layer (77) pre-coated with an adhesive layer (78) which may be a pressure sensitive adhesive, a hot melt adhesive, a heat, moisture, or radiation curable adhesive. Preferred materials for the adhesive include acrylics, styrene-butadiene copolymers, styrene-butadiene-styrene block copolymers, styrene-isoprene-styrene block copolymers, polyvinylbutyral, cellulose acetate butyrate, polyvinylpyrrolidone, polyurethanes, polyamides, ethylene-vinylacetate copolymers, epoxides, multifunctional acrylates, vinyls, vinylethers, and their oligomers, polymers, and copolymers.

10. Harden the adhesive.

Alternatively, the second conductor or a substrate layer (77) may be disposed onto the sealed microcups by a method such as coating, printing, vapor deposition, sputtering, or a combination thereof. A color filter or protective overcoat such as an antiglare protective coating comprising a particulate filler may be applied onto the sealed microcups or the second electrode layer to improve the optical or physicomechanical properties of the finished panel.

The preparation of the microcups described in the process above can conveniently be replaced by the alternative procedure of imagewise exposing the conductor film coated with a radiation curable composition followed by removing the unexposed areas by an appropriate solvent. The top-sealing of the microcups may be alternatively accomplished by directly coating a layer of the top-sealing composition over the surface of the liquid phase. The positively working photoresist in Step 4 may alternatively be applied onto the unfilled microcup array by a conventional wet coating process.

The thickness of the display produced by the present processes as described can be as thin as a piece of paper. The width of the display is the width of the coating web (typically 3–90 inches). The length of the display can be anywhere from inches to thousands of feet depending on the size of the roll.

VI. Semi-finished Display Panels

The semi-finished display panel comprises an array of the filled and top-sealed display cells sandwiched between a temporary substrate and a conductor or substrate layer or between two temporary substrates. A monochrome or multicolor semi-finished display panel may be prepared by the multiple step process as described in Section IV or Section V above, respectively, except that the second conductor or substrate layer is replaced with a temporary substrate. Alternatively, the layer of the embossable composition may be coated on a temporary substrate instead of a conductor layer and in the final step, a temporary substrate, a conductor layer, or a permanent substrate layer is laminated over the filled and top-sealed display cells. The temporary substrate such as a release liner may be formed from a material selected from the group consisting of polyethylene terephthalate (PET), polycarbonate, polyethylene (PE), polypropylene (PP), paper and a laminated or cladding film thereof. A silicone release coating may be applied onto the temporary substrate to improve the release properties.

The semi-finished display panel may be supplied to customers in the form of a roll and the customers may cut the roll of the semi-finished panel into desired formats and sizes to meet their specific needs.

The conversion of a semi-finished panel to a finished display panel is illustrated in FIG. 8. FIG. 8a depicts a roll of semi-finished display panel. FIG. 8b depicts a cross-sectional view of a semi-finished display panel comprising an array of filled and top-sealed display cells (80) sandwiched between a temporary substrate (81) and a first conductor layer or substrate (82). The temporary substrate (81) is laminated over the filled and top-sealed display cells, optionally with an adhesive layer (83). FIG. 8c depicts that the temporary substrate (81) is peeled off and in FIG. 8d, a second conductor layer (84) is laminated onto the array of the filled and top-sealed display cells. Alternatively, a substrate or electrode layer may be disposed onto the top-sealed microcups by a method such as coating, printing, vapor deposition, sputtering or a combination thereof.

In FIG. 8d, the first conductor layer (82) is the viewing side whereas the second conductor layer (84) laminated onto the filled and top-sealed display cells is the non-viewing side. It is also possible to view from the other side (84) if a transparent second electrode layer (84) is used.

When the semi-finished panel comprises an array of filled and top-sealed display cells sandwiched between two temporary substrates, the semi-finished display panel may be converted to a finished display panel by removing the two temporary substrate layers first and laminating two permanent substrate layers, at least one of which comprises a conductor layer, over the filled and top-sealed display cells. Alternatively, the permanent substrate layers may be disposed onto the top-sealed microcups by a method such as coating, printing, vapor deposition, sputtering or a combination thereof.

EXAMPLES

The following examples are given to enable those skilled in the art to more clearly understand and to practice the present invention. They should not be considered as limiting the scope of the invention, but merely as being illustrative and representative thereof.

Example 1

Preparation of Microcups by Microembossing

The composition shown in Table 1 was coated onto Mylar™ J101/200 guage using a Nickel Chrome bird type film applicator with an opening of 3 mil. The solvent was allowed to evaporate leaving behind a tacky film with a Tg below room temperature.

TABLE 1

PMMA-containing composition for microembossing

| No. | Description | Ingredient | Supplier | Wt % |
|---|---|---|---|---|
| 1 | Epoxy acrylate | Ebecryl ™ 3605 | UCB Chemicals | 7.35 |
| 2 | Monomer | Sartomer ™ SR205 | Sartomer | 9.59 |
| 3 | Urethane acrylate | Ebecryl ™ 6700 | UCB Chemicals | 4.87 |
| 4 | Polymethylmethacrylate | Elvacite 2051 | ICI | 9.11 |
| 5 | Photoinitiator | Darocur ™ 1173 | Ciba | 1.45 |

TABLE 1-continued

PMMA-containing composition for microembossing

| No. | Description | Ingredient | Supplier | Wt % |
|---|---|---|---|---|
| 6 | Cationic photoinitiator | Cyracure ™ UVI 6976 | Union Carbide | 0.60 |
| 7 | Solvent | Acetone | Aldrich | 67.03 |
|   |   | Total |   | 100.00 |

A pre-patterned stencil from Photo Stencil, Colorado Springs, Colo., was used as the male mold for microembossing and Frekote™ 700-NC from Henkel was used as the mold release. The coated film was then embossed by the stencil using a pressure roller at room temperature. The coating was then UV cured for about 20 minutes through the Mylar™ film using a Loctite Zeta 7410™ exposure unit equipped with a metal fluoride lamp with an intensity of 80 mW/cm$^2$ at 365 nm. The embossed film was then released from the mold to reveal well-defined microcups having lateral dimensions ranging from 60 μm to 120 μm (200–400 dpi) and a depth ranging from 5 μm to 30 μm as measured by optical profilometry and microscope (FIGS. 4a–4c).

Example 2

Preparation of Microcups

A composition containing solid oligomer, monomer and additive is shown in Table 2. The glass transition temperature of the mixture is again below room temperature. The tacky coating was deposited on top of Mylar™ J101/200 guage as before. Embossing was conducted at 60° C. using a heated pressure roller or laminator. Well-defined high resolution microcups (100–400 dpi) with depth ranging from 5–30 microns were produced.

TABLE 2

Embossing composition containing oligomer, monomer, additive and solvent

| No. | Description | Ingredient | Supplier | Wt % |
|---|---|---|---|---|
| 1 | Epoxy acrylate | Ebecry ™ 1 3903 | UCB Chemicals | 17.21 |
| 2 | Monomer | HDODA | UCB Chemicals | 8.61 |
| 3 | Urethane acrylate | Ebecryl ™ 4827 | UCB Chemicals | 2.87 |
| 4 | Photoinitiator | Irgacure ™ 500 | Ciba | 1.43 |
| 5 | Slip | Ebecryl ™ 1360 | UCB Chemicals | 1.60 |
| 6 | Solvent | Acetone | Aldrich | 68.26 |
|   |   | Total |   | 100 |

Example 3

Preparation of Pigment Dispersion in Dielectric Solvent

Polystyrene (0.89 grams, Polysciences, Inc., mw. 50,000) and AOT (0.094 grams, American Cyanamide, sodium dioctylsulfosuccinate) were dissolved in 17.77 grams of hot xylene (Aldrich). Ti-Pure R-706™ (6.25 grams) was added to the solution and ground in an attritor at 200 rpm for more than 12 hours. A low viscosity, stable dispersion was obtained. Oil-blue N (0.25 grams, Aldrich) was added to color the dispersion. The suspension was then tested in a standard electrophoretic cell comprising two ITO conductor plates separated by a 24 microns spacer. High contrast, alternating white and blue images were observed with a switching rate of about 60 Hz and a rising time of 8.5 msec at 80 volts.

Example 4

Preparation of Pigment Dispersion

The experiment of Example 3 was repeated, except Oil Red EGN (Aldrich) and an electrophoretic cell with a 24 microns spacer were used. High contrast, alternating red and white images were observed with a switching rate of 60 Hz and a rising time of 12 msec at 60 volts.

Example 5

Preparation of Pigment Dispersion

Ti-Pure R-706™ (112 grams) was ground by an attritor in a solution containing 11.2 grams of a maleic anhydride copolymer (Baker Hughes X-5231™), 24 grams of 3,4-dichlorobenzotrifluoride, and 24 grams of 1,6-dichlorohexane (both from Aldrich). Similarly, 12 grams of carbon black were ground in a solution containing 1.2 grams of alkylated polyvinylpyrrolidone (Ganex™ V216 from ISP), 34 grams of 3,4-dichlorobenzotrifluoride, and 34 grams of 1,6-dichlorohexane (Aldrich) at 100° C. These two dispersions were then mixed homogeneously and tested. High contrast black and white images were observed with a switching rate up to 10 Hz and a rising time of about 36 msec at 100 volts.

Example 6

Top-Sealing the Microcups by One-step Process 0.05 Ml of a UV curable composition comprising 1 wt % of benzyl dimethyl ketal (Esacure KB1™ from Sartomer) in HDDA (1,6-hexanediol diacrylate from Aldrich) was dispersed into 0.4 ml of a dielectric solvent comprising 0.5 wt % of 2,2,3,3,4,4,5,5,6,6,7,7,8,8,9,9,10,10,10-nonadecafluoro-1-decanol (Aldrich) in FC-43™ from 3M Company. The resultant dispersion was then immediately filled into an array of microcups as prepared in Example 2. Excess of fluid was scraped away by a wiper blade. The HDDA solution was allowed to phase separate for at least 30 seconds and cured by UV radiation (10 mw/cm$^2$) for about 1 minute. A hard, clear layer was observed on the top of the microcups and the microcups were top-sealed.

Example 7

Top-Sealing the Microcups by a Two-step (Overcoating and UV Curing) Process

The electrophoretic fluid prepared in Example 5 was coated onto the microcup array as prepared in Example 2. A thin layer of Norland optical adhesive NOA 60™ (Norland Products Inc., New Brunswick, N.J.) was coated onto the filled microcups. Any excess of the UV adhesive was scraped off by a strip of Mylar™ film and cleaned by a piece of absorbing paper. The overcoated adhesive was then cured immediately under a Loctite Zeta 7410™ UV exposure unit for about 15 minutes. The microcups were top-sealed completely and no air pocket was observed. The thickness of cured adhesive layer was about 5–10 microns as measured by a Mitutoyo thickness gauge.

Example 8

Top-Sealing the Microcups by a Two-step (Overcoating and Moisture Curing) Process The experiment of Example 7 was repeated, except the Norland adhesive was replaced by Instant Krazy™ glue from Elmer's Products, Inc., Columbus, Ohio. The overcoated adhesive was then cured for 5 minutes by moisture in air. The microcups were top-sealed completely and no air pocket was observed. The thickness of cured adhesive layer was about 5–10 microns as measured by a Mitutoyo thickness gauge.

Example 9

Top-Sealing the Microcups by a Two-step (Overcoating and Interfacial Polymerization) Process The experiment of Example 8 was repeated, except the electrophoretic fluid was replaced by a 3,4-dichlorobenzotrifluoride solution containing 0.3 wt % of tetraethylenepentamine (Aldrich) and the Instant Krazy™ glue was replaced by an aliphatic polyisocyanate (Desmodur™ N 3300 from Bayer Corp.) solution in anhydrous ether. A highly crosslinked thin film was observed almost immediately after overcoating. The dielectric solvent was completely sealed inside the microcups after the ether was evaporated at room temperature. No air pocket was observed.

While the present invention has been described with reference to the specific embodiments thereof, it should be understood by those skilled in the art that various changes may be made and equivalents may be substituted without departing from the true spirit and scope of the invention. In addition, many modifications may be made to adapt a particular situation, materials, compositions, processes, process step or steps, to the objective, spirit and scope of the present invention. All such modifications are intended to be within the scope of the claims appended hereto.

What is claimed is:

1. A display panel comprising an array of display cells sandwiched between two temporary substrate layers, between a temporary substrate layer and a conductor layer or between a temporary substrate layer and a permanent substrate layer wherein said display cells are filled with an electrophoretic fluid and top-sealed with a polymeric sealing material formed from a top-sealing composition having a specific gravity lower than that of the electrophoretic fluid.

2. The display panel of claim 1 wherein said top-sealing composition is a thermoplastic or thermoset precursor composition.

3. The display panel of claim 2 wherein said thermoplastic or thermoset precursor composition comprises a material selected from the group consisting of polyvalent acrylates or methacrylates, cyanoacrylates, polyvalent vinyls, polyvalent epoxides, polyvalent isocyanates, polyvalent allyls, and oligomers or polymers comprising a crosslinkable functional group.

4. The display panel of claim 1 which panel is in the form of a roll.

5. The display panel of claim 1 wherein said top sealing composition is a radiation, heat or moisture curable composition.

6. The display panel of claim 1 wherein said top sealing compositon is a UV curable composition.

7. A display panel comprising an array of filled and top-sealed display cells sandwiched between a first temporary substrate layer and a second temporary substrate layer, between a first temporary substrate layer and a conductor layer or between a first temporary substrate layer and a permanent substrate layer wherein said display cells are formed on said first temporary substrate layer, filled with an electrophoretic fluid and top-sealed with a polymeric sealing material formed from a top-sealing composition having a specific gravity lower than that of the electrophoretic fluid before the second temporary substrate layer, the conductor layer or the permanent substrate layer is assembled onto the display panel.

8. A semi-finished display panel comprising an array of display cells sandwiched between two temporary substrate layers, between a temporary substrate layer and a conductor layer or between a temporary substrate layer and a permanent substrate layer wherein said display cells are filled with an electrophoretic fluid and top-sealed with a polymeric sealing material formed from a top-sealing composition which is hardened after it forms a supematant layer on top of the electrophoretic fluid or after it is overcoated onto the electrophoretic fluid.

9. The semi-finished display panel of claim 8 wherein said top sealing composition is a radiation, heat or moisture curable composition.

10. The semi-finished display panel of claim 8 wherein said top sealing composition is a UV curable composition.

* * * * *